Nov. 18, 1958    H. I. BECKER, JR    2,860,778
METHOD AND APPARATUS FOR TESTING MAGNETS
Original Filed July 11, 1951    2 Sheets-Sheet 1

INVENTOR.
HOWARD I. BECKER, JR.
BY
HIS ATTORNEY

Nov. 18, 1958  H. I. BECKER, JR  2,860,778
METHOD AND APPARATUS FOR TESTING MAGNETS
Original Filed July 11, 1951  2 Sheets-Sheet 2

INVENTOR.
HOWARD I. BECKER, JR.
BY
HIS ATTORNEY

United States Patent Office 2,860,778
Patented Nov. 18, 1958

2,860,778

METHOD AND APPARATUS FOR TESTING MAGNETS

Howard I. Becker, Jr., Louisville, Ky., assignor to General Electric Company, a corporation of New York Original application July 11, 1951, Serial No. 236,202, now Patent No. 2,781,127, dated February 12, 1957. Divided and this application October 12, 1956, Serial No. 615,697

4 Claims. (Cl. 209—72)

This application is a division of application Serial No. 236,202, and now Patent No. 2,781,127, filed July 11, 1951 in the name of Howard I. Becker, Jr. and assigned to the same assignee as the present invention.

My invention relates to methods and apparatus for testing magnets.

It has been found that magnets made of similar composition and by similar processes will have varying magnetic strengths. In many applications it is necessary that the magnetic strength be above a predetermined minimum in order to accomplish the desired result. For example, in the copending application of Alfred G. Janos, Serial No. 122,961, and now Patent No. 2,807,841, filed October 22, 1949 and assigned to the same assignee as the present application, a plurality of elongated magnets are employed within a gasket on a refrigerator door for sealing the access opening of the refrigerator. In such an application it is essential that each of the magnets employed be above a predetermined magnetic strength so as to insure effective sealing throughout the length of the gasket.

Accordingly, it is necessary to test the individual magnets to insure that they are at least of the required magnetic strength and, where large quantities of magnets are required as in the magnetic gasket of the above-identified application, this testing represents a substantial problem. Magnets can, of course, be tested by moving the individual magnet through a coil and reading on a galvanometer the current induced in the coil. However, where large quantities of magnets are required, as in mass production of such items as the magnetic gasket, such a tedious method of testing is obviously too slow. I have found that if a magnet is dropped through a tube of non-magnetic, electrically-conducting material, such as copper or aluminum, or is arranged to fall adjacent or in contact with a wall or a trough composed of non-magnetic, electrically-conducting material, the speed will vary in accordance with the strength of the magnet, and I employ this characteristic in my apparatus for the purpose of discriminating between magnets of various strengths.

Accordingly, it is an object of my invention to provide improved apparatus for rapidly distinguishing between magnets of various strengths.

It is another object of my invention to provide an improved apparatus for automatically separating magnets above and below a predetermined strength.

It is a further object of my invention to provide improved methods for distinguishing between and separating magnets of different strengths.

Other objects and advantages of my invention will become apparent as the following description proceeds and the features of novelty which characterize my invention will be pointed out with particularity in the claims annexed to and forming part of this specification.

In carrying out the objects of my invention a generally vertical hollow member or tube or a wall is provided and magnets are dropped into the open upper end of this tube or immediately adjacent or in contact with the wall. The hollow member, or the wall, is composed of a non-magnetic, electrically-conducting member. The time required for the magnets to fall a predetermined distance is measured, thereby discriminating between magnets of different strengths. Alternatively the speed, which, of course, like the total time, varies with the magnet strength, is employed for distinguishing between and separating magnets of different strengths.

For a better understanding of my invention, reference may be had to the accompanying drawing in which.

Figure 1:
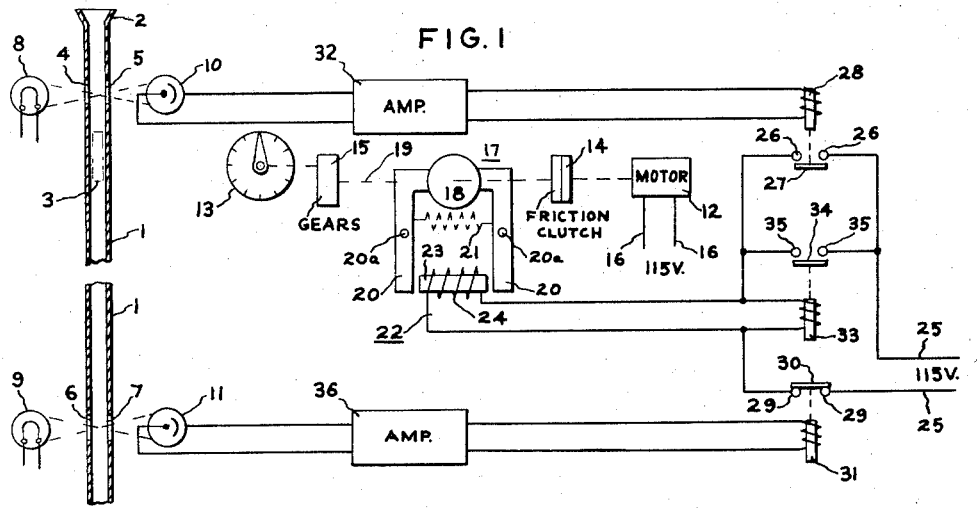
Fig. 1 is a schematic illustration of one form of my invention.

Referring to Fig. 1, there is shown a magnet testing apparatus which includes a hollow vertical member or tube 1 which is provided with a mouth 2 at its upper end for receiving magnets to be tested. In the form illustrated the magnets, one of which is shown at 3, are of elongated cylindrical shape, and the inside diameter of the tube 1 slightly exceeds that of the magnets 3 so that the magnets may fall through the tube with relatively little mechanical friction. While, in the form illustrated, a tube is employed and the magnets are of circular cross section, it will be apparent that hollow members of other cross sections, for example, oval, square, rectangular, etc., may be employed, and similarly the magnets may be of cross sections other than circular and may, if desired, be of other shapes, for example, U-shaped, in lieu of elongated.

The tube 1 is formed of any of a number of materials which are both non-magnetic and electrically-conducting. As examples, I have employed both copper and aluminum, both of which have a permeability of substantially unity and may be regarded as falling in the category of non-magnetic. As the magnet 3 falls through the tube the motion of the magnet relative to the tube causes eddy currents to be induced in the electrically-conducting material of the tube, and these eddy currents, in accordance with Lenz' Law, act to set up a field opposing the motion of the magnet. The magnitude of the eddy currents so induced and hence the magnitude of the opposing force varies with the strength of the particular magnet being tested. Since the magnets being tested are of substantially the same weight the downward force acting on the magnets is substantially the same in all cases. The ultimate speed of the magnet which results from the combined effect of the force of gravity acting on the magnet to increase its speed and the opposing effect of the eddy currents tending to reduce its speed will therefore vary with the magnitude of the eddy currents and hence with the strength of the magnet which induces the eddy currents.

It can be seen therefore that magnets of different strengths will reach different speeds and hence will require different times to negotiate a predetermined distance within the tube 1. This characteristic is utilized in the apparatus of Fig. 1 for differentiating between magnets of different strengths. In the upper portion of the tube 1 two diametrically opposite openings 4 and 5 are formed, these two openings in effect providing a transverse passage through the tube 1. Similar diametrically opposite openings 6 and 7 providing a similar transverse passage are arranged in the lower portion of the tube 1. A light source 8 is arranged on one side of the tube 1 in line with the passage formed by the aligned openings 4 and 5, and a second light source 9 is similarly arranged on one side of the tube 1 in line with the opening section 7. On the opposite side of the tube 1 in line with the passage formed by the aligned openings 4 and 5 and in line with the light source 8 there is arranged a light-sensitive cell 10. A similar light-sensitive cell 11 is arranged in line with the openings 6 and 7 and the second light source 9. As the magnet 3 passes between the aligned openings 4 and 5 in the upper portion of the tube the light from the light source 8 is blocked from the light-sensitive cell 10. Similarly when the magnet 3 passes the openings 6 and 7 the light from the light source 9 is blocked from the light-sensitive cell 11. These interruptions of the light to cells 10 and 11 are utilized, through energization of suitable apparatus, to measure the time required for the magnet 3 to traverse the distance between the aligned openings 4 and 5 and the aligned openings 6 and 7.

The measuring apparatus includes an electric motor 12 which drives a timer or indicator 13 through a friction clutch 14 and a gear box 15. The motor 12 is supplied with power of any suitable source through lines 16 and this motor rotates continuously while the apparatus is in use. A brake 17 is provided for starting and stopping the timer or indicator 13 in accordance with the energization of the apparatus by the magnet passing the aligned openings 4, 5 and 6, 7. This brake includes a drum 18 arranged on the shaft 19 which interconnects clutch 14 and gears 15 to drive timer 13. Two brake shoes or elements 20, which are pivoted at 20a, are arranged to engage the drum 18. The brake shoes 20 are normally biased into engagement with the drum to prevent rotation of the timer 13 by a spring 21 which is connected between the two brake shoes 20. A solenoid 22, which includes a core 23 and a surrounding coil 24, is arranged between the brake shoes 20 on the opposite side of the pivot points 20a from the drum-engaging portions of the shoes. When the coil 24 of the solenoid 22 is energized the adjacent ends of the brake shoes 20 are attracted, moving the shoes out of engagement with the drum 18 and permitting free rotation of the timer or indicator 13. When the coil 24 is de-energized the shoes are pressed by the spring 21 into engagement with the drum, preventing rotation of the timer 13, rotation of the motor 12 continuing because of the interposition of the friction clutch 14.

A circuit for energizing the coil 24 is supplied from any suitable power source through lines 25. This circuit includes contacts 26 adapted to be closed by a switch 27 controlled by a relay 28, and contacts 29 adapted to be closed by a second switch 30 controlled by a second relay 31. The switch 27 is normally open and the switch 30 is normally closed. The relay 28 is energized from the light-sensitive cell 10 through a conventional amplifier 32 each time the light from the light source 8 is blocked by a magnet passing the aligned openings 4 and 5. The energization of the relay 28 closes the circuit from the power source through the lines 25 to the coil 24 of the solenoid 22. The solenoid attracts the brake shoes 20 pulling the shoes away from the drum 18, releasing the brake and allowing rotation of the timer 13 to begin. The closing of the switch 26 by the relay 28 also energizes a holding relay 33 which closes a switch 34 across contacts 35. The holding relay continues supply of power from the lines 25 through the switch 34 to the coil 24 after the magnet 3 has passed beyond the aligned openings 4 and 5 and effected de-energization of relay 28.

The relay 31 is energized from the light-sensitive cell 11 through a conventional amplifier 36 each time a magnet passes the aligned openings 6 and 7 and blocks light from the light source 9 to the light-sensitive cell 11. The energization of the relay 31 moves the switch 30 from its normally-closed position, breaking the circuit from the lines 25 to the coil 24 and the holding relay 33. This returns the circuit elements to the condition shown in Fig. 1 and de-energizes the coil 24, allowing the spring 22 to bring the shoes 20 into engagement with the drum 18, stopping rotation of the timer 13. The total elapsed time required for the magnet 3 to traverse the distance from the aligned openings 4 and 5 to the aligned openings 6 and 7 is therefore recorded by the timer or indicator 13. The greater the strength of the magnet the slower its speed and hence the greater the total time required to traverse the distance mentioned. Therefore the amount of elapsed time measured by the timer 13 can be used to indicate the relative strength of the magnets being tested. If desired the indicator 13 can be graduated to indicate directly the strength of the magnet being tested or the velocity of the magnet instead of indicating elapsed time.

By way of example, I have found that using a copper tube having a one quarter inch inside diameter and magnets 3/16 inch in diameter and one inch long, a magnet having a flux of 2200 maxwells required five seconds to traverse a distance of five feet between the upper aligned openings 4 and 5 and the lower aligned openings 6 and 7. On the other hand a substantially unmagnetized element under the same circumstances required only 6/10 second to traverse this distance. I have further found that the speed of the magnet is generally inversely proportional to the conductivity of the tube. Thus the speed of the same magnets falling through an aluminum tube, which has about one half the conductivity of copper, is approximately double the speed of magnets falling through a copper tube.

I have found that the following equation, although not an exact mathematical derivation, seems to fit quite nicely the experimental results, and indicates a relationship of some of the variables involved:

$$T = K(e^{b\phi^2} - 1) + \sqrt{\frac{2S}{g}}$$

where:

$T$ = time of fall in seconds
$\phi$ = flux
$S$ = length of tube
$g$ = gravitational constant The term $b$ in the equation is employed to cover such elements as wall thickness of the tube, its conductivity, weight of the magnet, and ratios of the areas of the magnet and the inside diameter of the tube. In general the items included in $b$ may be related to some extent by the following equation:

$$b = dA_1 C / pW A_2$$

where:

$d$ = tube wall thickness
$p$ = resistivity of the material of the tube
$W$ = weight of the magnet
$A_1$ = cross sectional area of the magnet
$A_2$ = cross sectional area of the inside of the tube
$C$ = is a proportionality constant included to absorb other unknown variables and to give the equation dimensional equality.

The equations given above are not purported to be mathematically accurate since they have been developed primarily to relate these elements as closely as possible to the experimental results achieved. They are included merely as guidance to indicate a relationship between known variables and not as a basis for accurate calculations.

Figure 2:
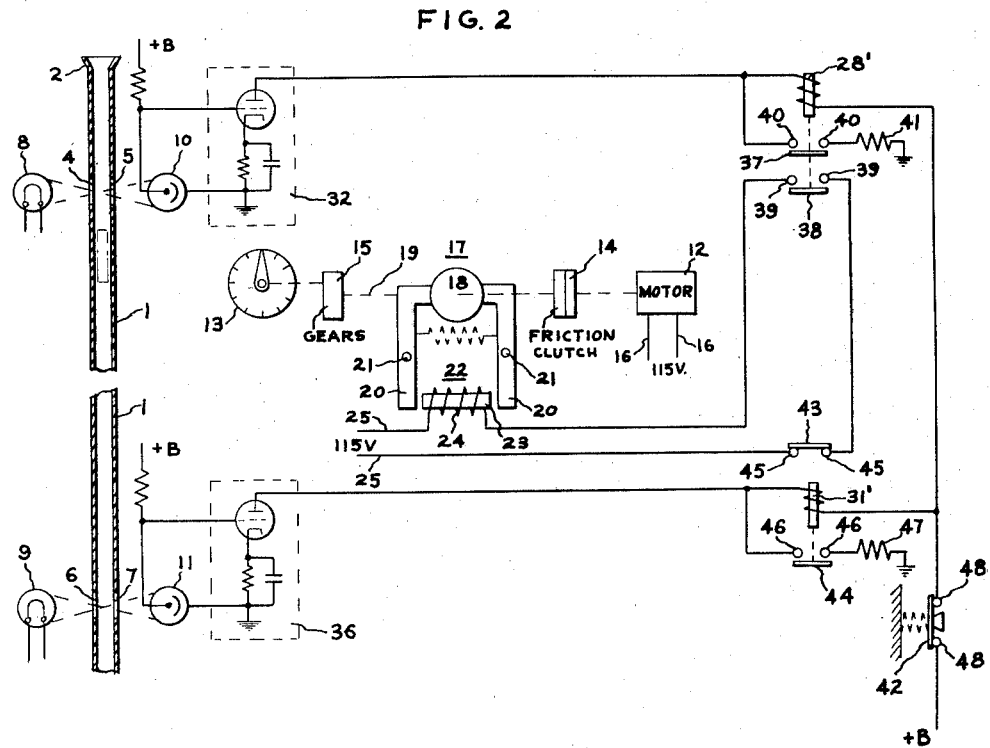
Fig. 2 is a modified form of the circuit arrangement shown in Fig. 1.

A modified form of the circuit of Fig. 1 is shown in Fig. 2. The circuit of Fig. 2 differs from that of Fig. 1 primarily because of the elimination of the separate holding relay 33, and the same numerals have been used to designate corresponding parts in Figs. 1 and 2. A relay 28' corresponding to the relay 28 in the circuit of Fig. 1, is energized through the amplifier 32 from the light-sensitive cell 10 when the falling magnet 3 blocks the light through the aligned openings 4 and 5. This relay actuates an element which includes two switches 37 and 38. The switch 38 is arranged to engage contacts 39 to close a circuit from the lines 25 to the coil 24 of the solenoid 22 when the relay 28' is energized. This is similar to the engagement of this switch 27 with the contacts 26 in the circuit of Fig. 1. The switch 37 is arranged to engage contacts 40 in a holding circuit for the relay 28'. This holding circuit includes a series resistor 41, the contacts 40, the coil of the relay 28', and a manual reset switch 42, the circuit being supplied from a source of direct current power, indicated by B+ for the positive side and by a ground symbol for the negative side. Thus the energization of the relay 28' energizes the coil 24 to initiate movement of the timer or indicator 13 and closes the circuit through the contacts 40 continuing the energization of the coil of the relay 28' even after the magnet 3 has passed the aligned openings 4 and 5 and light from the source 8 again reaches the light-sensitive cell 10.

A relay 31', which is energized through the amplifier 36 from the light-sensitive cell 11, also actuates an element having two switches 43 and 44. The switch 43 which corresponds to the switch 30 of the circuit of Fig. 1 is arranged in its normally closed position to engage contacts 45 in the circuit of the coil 24. The switch 44 is arranged to engage contacts 46 in a holding circuit for the coil of the relay 31'. This holding circuit is similar to that for the relay 28' and includes a series resistor 47, the contacts 46, the coil of the relay 31', and the manual reset switch 42. When the relay 31' is energized because of the magnet 3 passing the aligned openings 6 and 7 and blocking the light to the light-sensitive cell 11, the switch 43 is moved to its open position breaking the circuit of the coil 24 and allowing the brake shoes 20 to re-engage the drum 18 stopping the rotation of the timer 13. Because of the holding circuit for the relay 31' the switch 43 is maintained in the open position even after the magnet 3 has passed beyond the aligned openings 6 and 7. Thus after a magnet 3 has traversed the tube the switch 38 of the relay 28' is held in the closed position, rather than its normally open position, and the switch 43 of the relay 31' is held in an open position, rather than its normally closed position. The holding circuits for the relay 28' and 31' are de-energized by pressing the manual reset switch 42, breaking the circuits at the contacts 48 and returning the various elements to the condition shown in Fig. 2. Thus with the arrangements shown in Fig. 2 it is necessary to interrupt the circuit manually by pushing the reset switch 42 after each magnet is tested.

In the forms illustrated in Figs. 1 and 2 and described above, the magnets are individually dropped into the top of the tube and the time required to fall the distance between the two light beams is observed on the timer. By noting the total time required the relative strength of the magnets tested can be determined since, as explained above, the time varies inversely with the strength, and these arrangements can be employed for separating magnets above and below a predetermined strength.

Figure 3:
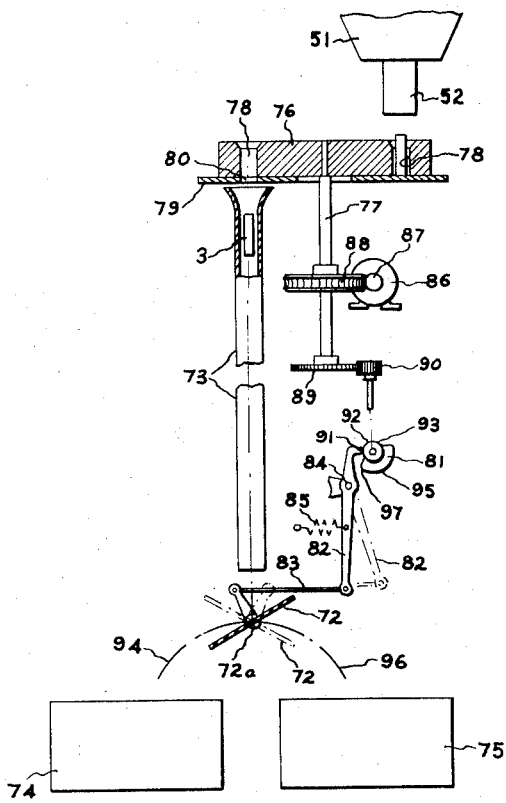
Fig. 3 is a diagrammatic view of apparatus illustrating another modified form of my invention.

In Fig. 3, there is shown a modified form of apparatus for automatically separating magnets of different strengths in which a movable vane 72 of non-magnetic material is employed in lieu of the inclined lower end of the hollow member or tube. The vane 72 is pivoted at 72a. The position of the vane is synchronized with the discharge of the magnets 3 into a hollow member or tube 73 of non-magnetic, electrically-conducting material so that weak, and hence rapidly falling, magnets are directed into a receptacle 74 and strong, and hence slowly falling, magnets are directed into a second receptacle 75. Magnets in an unmagnetized state are placed in the hopper 51 and are automatically supplied from the hopper in any conventional manner well known in the art for discharging items of this shape from a hopper. After leaving the hopper, the magnets pass through the magnetizing coil 52. Each of the magnets is directed into a horizontal drum 76 which rotates about a vertical axis or shaft 77 and is disposed beneath the hopper and magnetizing coil. The drum 76, which is composed of nonmagnetic material, includes a plurality of vertical passages or openings 78 arranged in spaced relationship annularly in the drum 76. As the drum 76 is rotated about its axis 77, the passages 78 successively pass beneath the hopper 51 and the magnetizing coil 52, and magnets 3 are received in these openings or passages 78. Beneath the drum 76, there is disposed a stationary horizontal plate 79 having an opening 80 therein arranged for convenience approximately diametrically opposite to the discharge point of the magnets from the coil 52. The upper end or mouth of the tube 73 is positioned directly below this opening 80 so that, as a particular magnet is moved during rotation of the drum 76 into alignment with the opening 80 it falls through the opening 80 and into the tube 73. The magnets 3 fall through the tube 73 as in previously described forms of invention and are discharged into the receptacle 74 or the receptacle 75 depending on whether the vane 72 occupies the solid line or the dotted line position.

The position of the vane is controlled by a cam 81 through a cam follower 82 and a linkage 83. The cam follower 82 is pivoted at 84 and is biased into engagement with the cam by a spring 85. The drum 76 and the cam 81 are driven by a common electric motor 86 through suitable gear trains, so that the motion of the drum and hence the discharge of the magnets through the opening 80 is coordinated with the position of the vane 72. The shaft 77 upon which the drum 76 is mounted is driven from the motor 86 through a worm gear 87 and pinion 88. A gear 89 is mounted on the lower end of this shaft and engages a pinion 90 to drive the cam 81. The gear ratios are chosen so that the cam 81 makes one revolution during the time the drum 76 rotates a distance equal to the spacing between successive passages or openings 78 therein. Thus the vane 72 completes one cycle during the time the drum 76 is rotating from a position wherein a particular passage 78 is aligned with the opening 80 to a position when the next adjacent passage is so aligned. The driving mechanisms are also correlated so that, with counterclockwise rotation of the cams 81, the cam follower 82 engages the cam 81 at approximately the point 91 at the time a magnet 3 is allowed to fall through the opening 80 from an aligned passage 78. Thus at the time a magnet 3 is discharged from the drum 76, the vane 72 occupies the solid line position shown in Fig. 3, and the vane remains in this position during the time the cam follower 82 rides along the surface 92 of the cam to the point 93 thereon. The time for the cam to rotate through this distance is chosen relative to the length of the tube 73, in other words relative to the distance from the drum to the vane 72, so that magnets below a predetermined strength will traverse the distance from the drum to the vane 72 by the time the cam has rotated to the point where the follower engages the point 93 thereon. Hence any magnet which is sufficiently weak that it reaches the vane 72 during this time is deflected from the vane into the receptacle 74 as indicated by the dashed line 94.

As the cam 81 continues to rotate beyond the position shown in Fig. 3, the cam follower 81 rides up onto the surface 95. This causes counterclockwise movement of the cam follower 82 and, through the linkage 83, clockwise movement of the vane 72 to the dotted line position shown in Fig. 3. With this position of the vane 72 any magnet falling through the tube 73 and striking the vane is deflected into the receptacle 75, as indicated by the dotted line 96. Hence any magnet above a predetermined strength and therefore, in accordance with the previous discussion, falling below a predetermined speed does not reach the vane 72 until after the vane has been shifted to the dotted line position. Such magnets above the predetermined minimum strength are, therefore, deflected into and collected in the receptacle 75. The vane 72 is maintained in the dotted line position while the cam follower 82 rides along the surface 95 of the cam to the point 97. At this time the cam follower rides down to the surface 92 of the cam, and the vane 72 is returned to its solid line position. As indicated previously, the movement of the cam and the movement of the drum are correlated so that the follower 82 reaches the point 91 on the cam surface and hence the vane 72 is returned to its solid line position at the time the next succeeding passage 78 is aligned with the opening 80 in the plate 79. Accordingly, a magnet 3 is then discharged from the drum and, if this magnet falls through the length of the tube 73 to the vane 72 within the time required for the follower to transverse the portion of the cam surface between the points indicated at 91 and 93, the magnet is below the predetermined minimum strength and is deflected into the receptacle 74. On the other hand, if the magnet is above the predetermined minimum strength a greater amount of time is required for the magnet to traverse the distance through the tube 73. In such case the cam rotates sufficiently during the fall of the magnet that the cam follower rides up onto the surface 95 and effects a shifting of the vane 72 to the dotted line position before the magnet reaches the vane. The magnet is, therefore, deflected into the receptacle 75 provided for collecting magnets above the predetermined minimum strength.

While I have shown and described specific embodiments of my invention, I do not desire my invention to be limited to the particular construction shown and described and I intend, by the appended claims, to cover all modifications within the spirit and scope of my invention.

What I claim as new and desire to secure by Letters Patent of the United States is:

1. Apparatus for testing magnets comprising a generally vertical hollow elongated member for loosely accommodating the magnets to be tested, said member having a first transverse passage therethrough in the upper portion thereof, said member having a second transverse passage therethrough spaced below said first passage, a first light source for directing light through said first passage, a second light source for directing light through said second passage, a first light-sensitive cell aligned with said first passage for receiving light from said first light source, a second light-sensitive cell aligned with said second passage for receiving light from said second light source, an indicator, means responsive to the interruption of light through said first passage by a magnet falling through said member past said first passage for initiating operation of said indicator, and means responsive to the interruption of light through said second passage by said magnet falling through said member past said second passage for stopping operation of said indicator.

2. Apparatus for testing magnets comprising a generally vertical hollow elongated member for loosely accommodating the magnets to be tested, said member having a first transverse passage therethrough in the upper portion thereof, said member having a second transverse passage therethrough spaced below said first passage, a first light source for directing light through said first passage, a second light source for directing light through said second passage, a first light-sensitive cell aligned with said first passage for receiving light from said first light source, a second light-sensitive cell aligned with said second passage for receiving light from said second light source, an indicator, a brake for governing movement of said indicator, said brake being biased to prevent movement of said indicator, means responsive to the interruption of light through said first passage by a magnet falling through said member past said first passage for releasing said brake to initiate movement of said indicator, and means responsive to the interruption of light through said second passage by said magnet falling through said member past said second passage for affording return of said brake to its biased position to stop movement of said indicator.

3. Apparatus for testing magnets comprising a generally vertical elongated member composed of a non-magnetic electrically-conducting material, means for supplying magnets to the upper end of said elongated member, means for confining the magnets to a path adjacent said elongated member, a pivoted vane below the lower end of said elongated member, and means for shifting said vane from a first position to a second position a predetermined length of time after an individual magnet is supplied to said upper end of said elongated member.

4. Apparatus for testing magnets comprising a generally vertical hollow member composed of a non-magnetic electrically-conducting material for loosely accommodating the magnets to be tested, a rotatable drum for supplying magnets one at a time to the upper end of said hollow member, a pivoted vane below the lower end of said member, a cam for actuating said vane between a first position and a second position, and means for correlating the movement of said drum and said cam whereby said cam effects a shifting of said vane from said first position to said second position a predetermined length of time after an individual magnet is supplied from said drum to the upper end of said hollow member.

References Cited in the file of this patent

UNITED STATES PATENTS 2,444,751     Scott     July 6, 1948

OTHER REFERENCES

Moullin: Principles of Electromagnetism, 1950, pp. 79–80 cited. (A copy is in the Patent Office Scientific Library.)